United States Patent
Wilhelms et al.

(10) Patent No.: US 8,596,909 B2
(45) Date of Patent: Dec. 3, 2013

(54) SEGMENTAL BIO-RETENTION BASIN SYSTEM

(75) Inventors: Paul Wilhelms, St. Louis, MO (US); Matt Snelling, St. Louis, MO (US); Jim Fetterman, St. Louis, MO (US)

(73) Assignee: HOK Product Design, LLC, Culver City, CA (US)

( * ) Notice: Subject to any disclaimer, the term of this patent is extended or adjusted under 35 U.S.C. 154(b) by 0 days.

(21) Appl. No.: 13/447,733

(22) Filed: Apr. 16, 2012

(65) Prior Publication Data

US 2012/0211406 A1 Aug. 23, 2012

Related U.S. Application Data

(63) Continuation of application No. 12/622,832, filed on Nov. 20, 2009, now Pat. No. 8,157,991.

(51) Int. Cl.
*B65G 5/00* (2006.01)

(52) U.S. Cl.
USPC .................................. 405/53; 405/36; 405/55

(58) Field of Classification Search
USPC .......... 405/36, 39, 53, 55; 210/170.03; 404/5; 52/285.1
See application file for complete search history.

(56) References Cited

U.S. PATENT DOCUMENTS

| | | | | |
|---|---|---|---|---|
| 876,985 A * | 1/1908 | Malancon | ..... | 52/585.1 |
| 2,802,339 A * | 8/1957 | Fogerty | ..... | 405/47 |
| 3,323,311 A * | 6/1967 | Johnson | ..... | 405/46 |
| 6,277,274 B1 * | 8/2001 | Coffman | ..... | 210/150 |
| 8,157,991 B2 * | 4/2012 | Wilhelms et al. | ..... | 210/150 |
| 2007/0256966 A1 * | 11/2007 | Siviter et al. | ..... | 210/150 |
| 2010/0021236 A1 * | 1/2010 | Kreikemeier | ..... | 405/55 |
| 2010/0206790 A1 * | 8/2010 | Holtz | ..... | 210/150 |

* cited by examiner

*Primary Examiner* — Benjamin Fiorello
(74) *Attorney, Agent, or Firm* — Bryan W. Bockhop; Bockhop & Associates, LLC

(57) ABSTRACT

A retention basin enclosure includes a plurality of prefabricated concrete vertical wall segments, a baffle unit and at least one steel connecting dowel. Each wall segment includes a horizontal top end that defines a notch and two vertical edges that define at least one cylindrical bore. The baffle segment includes a vertical edge surface that defines a plurality of cylindrical bores and a horizontal planar member from which a plurality of protrusions extend upwardly therefrom so that the baffle segment reduces water flow velocity. Two baffle vertical wall members each have a planar vertical surface that defines a plurality of cylindrical bores disposed so that at least one of the cylindrical bores defined by concrete baffle segment can be placed in alignment with at least one of the cylindrical bores defined by the planar vertical surface.

3 Claims, 5 Drawing Sheets

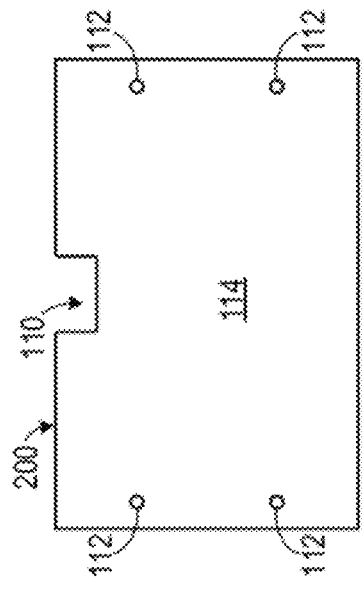
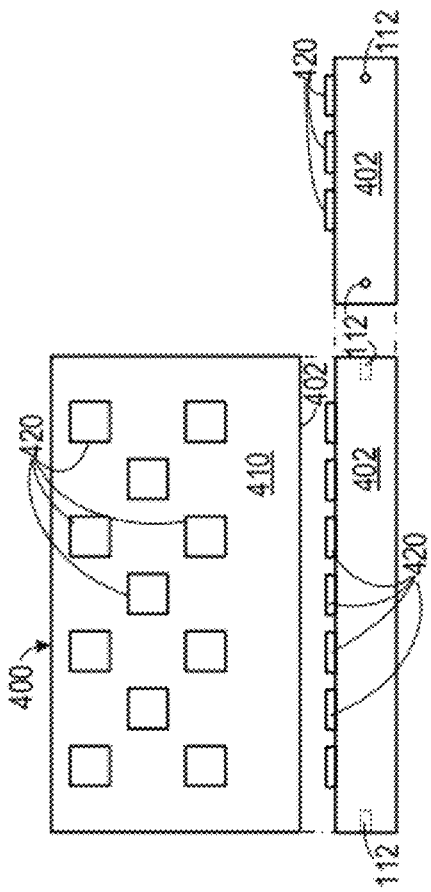
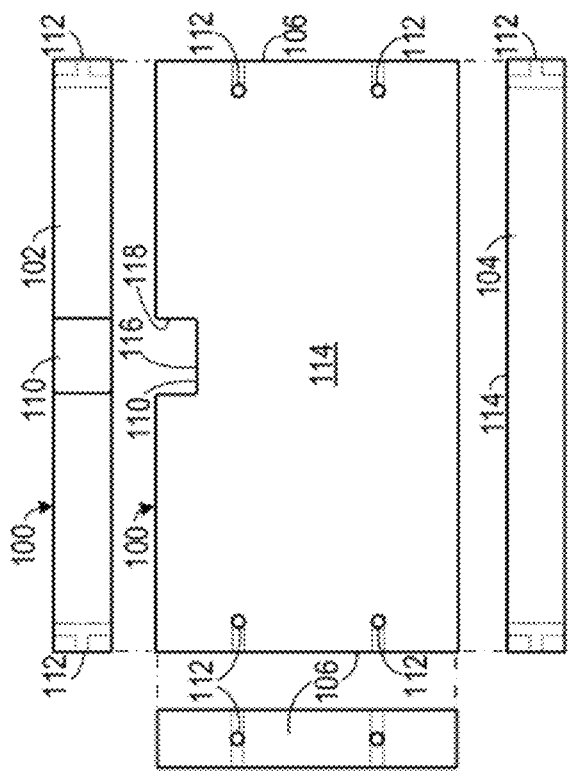
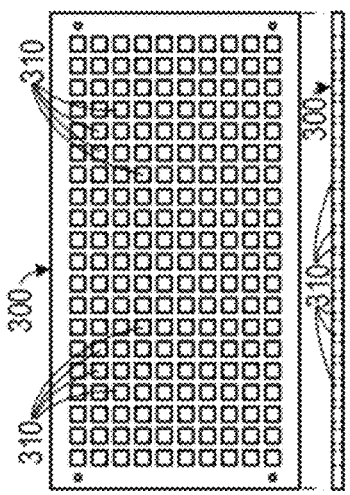
FIG. 1
FIG. 2
FIG. 3
FIG. 4

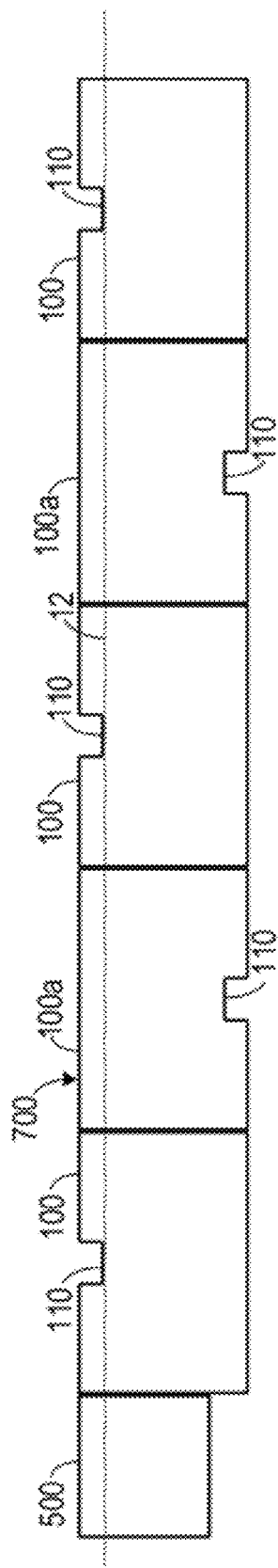
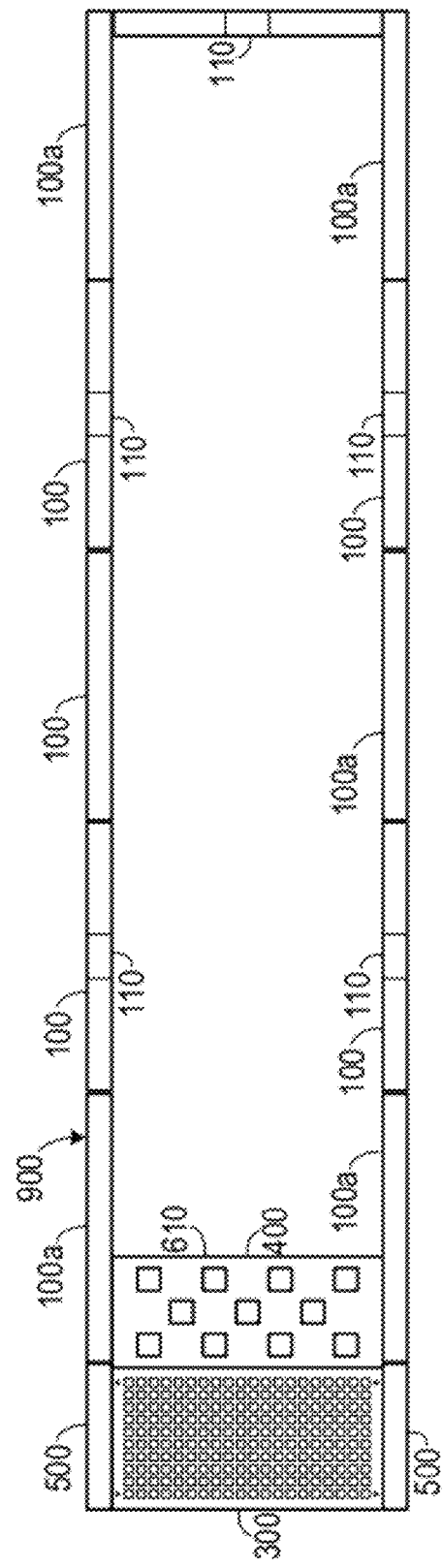

SEGMENTAL BIO-RETENTION BASIN SYSTEM

CROSS-REFERENCE TO RELATED APPLICATION(S)

This application is a continuation of, and claims the benefit of, U.S. patent application Ser. No. 12/622,832, filed Nov. 20, 2009, which issued on Apr. 17, 2012 as U.S. Pat. No. 8,157,991 the entirety of which is hereby incorporated herein by reference.

BACKGROUND OF THE INVENTION

1. Field of the Invention

The present invention relates to utility systems and, more specifically, to a prefabricated segmented system for building bio-retention system enclosures.

2. Description of the Prior Art

Storm water runoff places a substantial economic burden on public water treatment facilities. As open land comes under development and is paved over, storm water that would otherwise be absorbed by soil flows into local storm sewer systems. Such water often suspends solids and other pollutants as it flows over paved surfaces. Once in the storm sewer system, the water flows to a water treatment facility where it must be treated to remove the solids and pollutants. Not only is such water treatment expensive, but so is the cost of infrastructure improvements necessary to convey the storm water.

Local bio-retention basins are increasingly used to catch storm water and allow it to settle solids locally before transfer to a storm sewer system. Many such basins also allow storm water to be infiltrated into the surrounding soil, thereby reducing the demands placed on the local storm sewer system.

A bio-retention system can be configured as a rain garden. A rain garden is a garden that diverts storm water for storm water filtration and groundwater recharge. Typically, a rain garden includes an area that retains storm water that would otherwise flow into the storm sewer system. Rain gardens mitigate the effects of runoff in urban areas by allowing storm water to seep into the water table, thereby filtering the water by the surface soil and preventing flow of the storm water into the storm sewer system. Also, some rain gardens use storm water to grow aesthetically pleasing plants, thereby making urban areas more attractive. Use of rain gardens in medians and next to sidewalks that would otherwise be paved over results in less stress on the municipality's drainage systems, improved groundwater quality and a more pleasing urban environment.

Most bio-retention basins include a surrounding curb or retaining wall used to form an enclosure that keeps water local to the basin. Water inlets are included to allow water to flow into the basin and water outlets are provided to allow overflow to exit the basin.

Unfortunately, in an urban environment, construction of bio-retention basins can be difficult to construct and expensive. One method of constructing such a basin includes setting concrete forms in the configuration of the basin, placing concrete in the forms, allowing the concrete to cure, removing the forms and then placing gravel and soil in the basin. This method is costly, labor intensive and may be difficult to perform in a limited urban environment.

Another method includes pre-casting an entire unitary retention system designed to fit into a specific site. The unitary system is then transported to the site on a truck and then installed. Such a unitary system can be bulky and costly to transport. This method may also be difficult to use in limited urban environments and it is inflexible because once installed, it cannot be easily modified.

Therefore, there is a need for a segmental bio-retention enclosure system that is prefabricated, easily transported, inexpensive and that can be arranged in various layouts to accommodate given site conditions.

SUMMARY OF THE INVENTION

The disadvantages of the prior art are overcome by the present invention which, in one aspect, is a bio-retention basin enclosure system that includes a plurality of prefabricated vertical wall segments and a baffle unit. Each of the plurality of wall segments includes a horizontal top end that defines a notch, an opposite horizontal and substantially flat bottom end, a first vertical edge, a second opposite vertical edge, a front vertical surface and an opposite back vertical surface. Each of the first vertical edge and the second vertical edge defines at least one cylindrical bore configured to receive a connecting dowel therein. The baffle unit is configured to be coupled to at least one of the plurality of prefabricated vertical wall segments and to be held in alignment therewith by at least one connecting dowel. The baffle unit includes a water velocity reduction member that is configured to reduce a velocity of water flowing into the baffle unit. At least one connecting dowel has dimensions complimentary to the bore defined by the plurality of prefabricated vertical wall segments and the bore defined by the baffle unit so as to be configured to hold the baffle unit in alignment with at least one of the plurality of prefabricated vertical wall segments.

In another aspect, the invention is a system for constructing bio-retention basin enclosures system that includes a plurality of prefabricated vertical wall segments, at least one prefabricated baffle segment, a planar grate segment, and at least two prefabricated baffle vertical wall members. Each of the plurality of wall segments includes a horizontal top end that defines a notch, an opposite horizontal bottom end, a first vertical edge, a second opposite vertical edge, a front vertical surface and an opposite second vertical surface. Each of the first vertical edge and the second vertical edge defines at least one cylindrical bore configured to receive a connecting dowel therein. The at least one prefabricated baffle segment includes a vertical edge surface, defining a plurality of cylindrical bores, each of which is configured to receive a connecting dowel therein, and a planar member from which a plurality of protrusions extend upwardly therefrom so that the baffle segment is configured to reduce water flow velocity. The planar grate segment defines a plurality of holes passing there through. The at least two prefabricated baffle vertical wall members each have a planar vertical surface that defines a plurality of cylindrical bores disposed so that at least one of the cylindrical bores defined by the vertical edge surface of the prefabricated concrete baffle segment is configured to be placed in alignment therewith. The two baffle vertical wall members are configured to support the prefabricated concrete baffle segment and the planar grate segment so as to form a baffle unit.

In yet another aspect, the invention is a retention basin enclosure that includes a plurality of prefabricated concrete vertical wall segments, a baffle unit and at least one steel connecting dowel. Each of the plurality of wall segments includes a horizontal top end that defines a notch, an opposite horizontal bottom end, a first vertical edge, a second opposite vertical edge, a front vertical surface and an opposite second vertical surface, each of the first vertical edge and the second vertical edge defining at least one cylindrical bore. The at least one prefabricated concrete baffle segment includes a vertical edge surface that defines a plurality of cylindrical bores and a horizontal planar member from which a plurality of protrusions extend upwardly therefrom so that the baffle segment is configured to reduce water flow velocity. A planar grate segment defines a plurality of holes passing there through. At least two prefabricated concrete baffle vertical wall members each have a planar vertical surface that defines a plurality of cylindrical bores disposed so that at least one of the cylindrical bores defined by the vertical edge surface of the prefabricated concrete baffle segment is configured to be placed in alignment with at least one of the cylindrical bores defined by the planar vertical surface. At least one steel connecting dowel has a first portion of which that is disposed in the bore defined by a selected one of the plurality of prefabricated concrete vertical wall segments and a second portion of which that is disposed in the bore defined by one of the vertical edge surface of the baffle unit so as to couple the at least one of the plurality of prefabricated vertical wall segments to the baffle unit.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1-5 are schematic diagrams of different modular components of a retention basin system.

FIG. 8 is an elevational view of one configuration for a retention basin wall using modular components shown in FIGS. 1 and 5.

FIGS. 9A-9C are top plan views of different configurations of retention basins that can be constructed using the modular components shown in FIGS. 1-5.

DETAILED DESCRIPTION OF THE INVENTION

Figure 5:
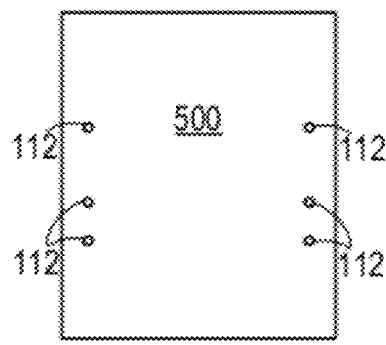

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1-5, one embodiment employs a kit of modular segments that are typically constructed from precast concrete. The segments may be put together to form the structure of an enclosure for a retention basin (which, in one representative embodiment can include a rain garden). For example, FIG. 1 shows a main wall segment 100 having a top end 102 a bottom end 104, two side ends 106, a front vertical surface 114 and an opposite back vertical surface 115. Typically, the top end 102 has a rectangular notch 110 formed therein for allowing storm water to drain into or out of the retention basin. The notch 110 includes a substantially flat bottom surface 116 and two vertical surfaces 118. When the bottom surface 116 is placed at ground level, the notch 110 provides a drain for water flowing into or out of the basin.

The ends 106 of the segments 100 include a mechanism to maintain the segments in alignment. For example, bores 112 (which could be cylindrical or, as those of skill in the construction art would readily recognize, of another shape such as prismatic) are be formed therein to receive connecting dowels. When aesthetics require a top surface without a notch 110, the segment may be inverted so that the bottom end 104 is on top and the notch 110 is buried. A shortened segment 200 is shown in FIG. 2. This segment 200 may be used to allow different geometric configurations that would not be possible using only the main segment 100. As will be readily appreciated by those of skill in the construction arts, the specific dimensions of the segments and the materials from which they are constructed can vary depending on the specific application.

A drain grate segment 300 is shown in FIG. 3. This segment 300 is used to allow storm water to drain into the retention basin while allowing people to walk on the grate. The drain grate segment 300 includes a plurality of holes 310 passing therethrough. Typically, this segment 300 is used with a water baffle segment 400 and a vertical wall segment 500 to form a baffle unit. The water baffle segment 400 includes an edge surface 402 that defines several bores 112 and a horizontal surface 410 from which plurality of protrusions 420 extend upwardly therefrom (and possibly indentations). The baffle segment 400 is used to reduce the velocity of incoming water and to disperse the water over a wider area so as to reduce local erosion in the retention basin.

Figure 6A:
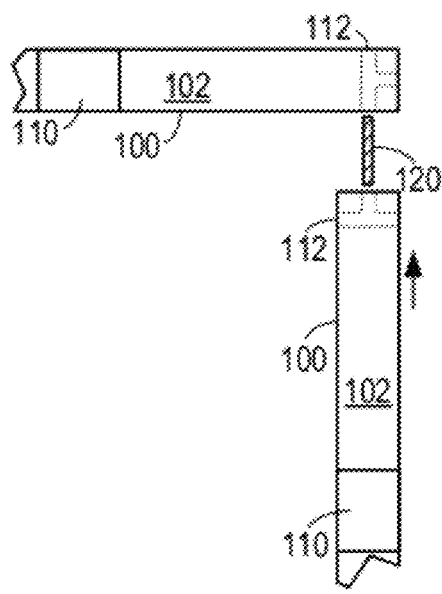
FIGS. 6A-6C are top plan views showing the coupling of a first segment and a second segment.
Figure 6B:
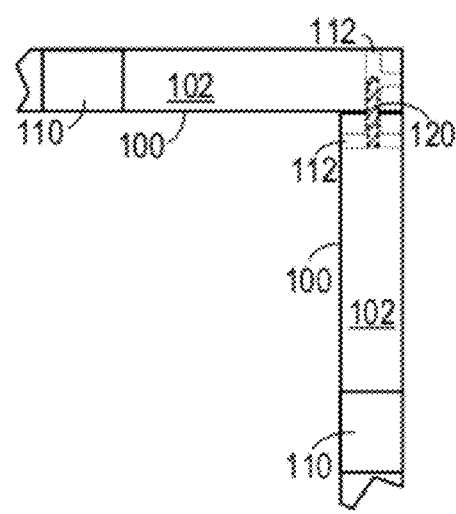
Figure 6C:
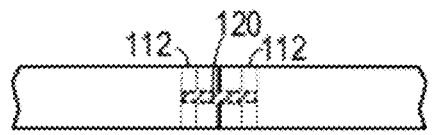

As shown in FIGS. 6A-6C, the segments 100 (and similar segments disclosed above) include bores 112 that allow them to be held in alignment with each other when a dowel 120 (such as a steel rod, a stainless steel rod, or a rod made of another material having a suitable shear strength for the specific application) is placed therein. A corner configuration is shown in FIGS. 6A-6B, wherein FIG. 6A shows the segments 100 prior to coupling and FIG. 6B shows the segments 100 after coupling. An end-to-end configuration is shown in FIG. 6C.

Figure 7A:
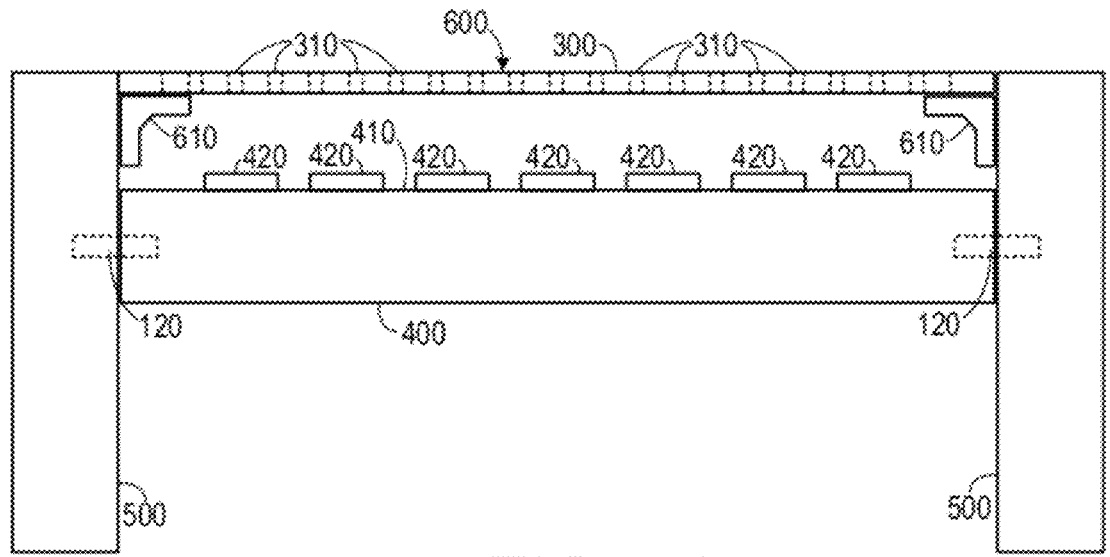
FIGS. 7A and 7B are schematic diagrams of an inflow baffle unit constructed from components shown in FIGS. 3-5.
Figure 7B:
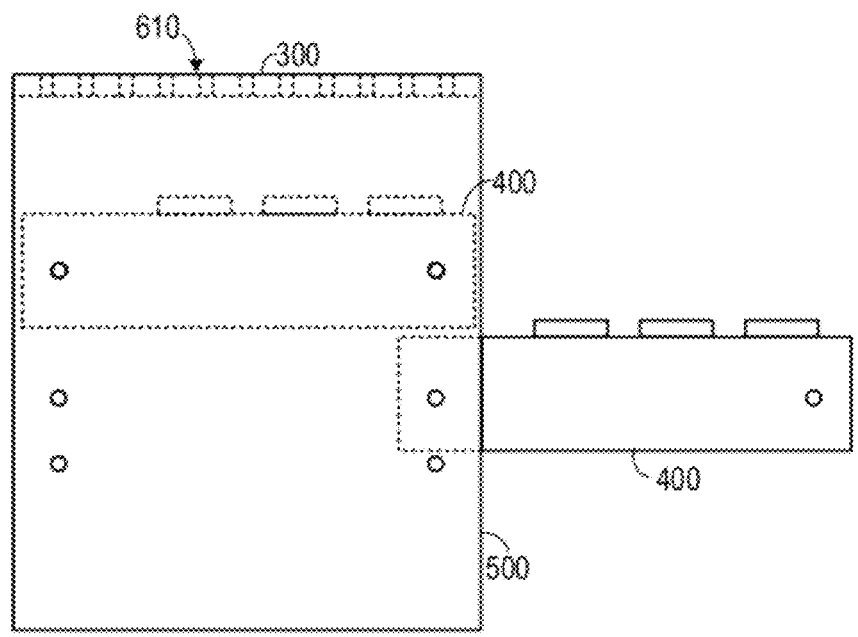

An example of a baffle unit 600 constructed from the segments discussed above is shown in FIG. 7A. Such a structure includes two vertical wall segments 500 that are coupled to a baffle segment 400 with four dowels 120. A drain grate segment 300 coupled to the vertical wall segments 500 with several metal corner brackets 610 (or other types of fasteners as would be readily appreciated by those of skill in the art). As water drains in through the holes 310 defined by the drain grate segment 310, it is dispersed by the protrusions 420 extending from the horizontal surface 410 of the baffle segment 400, there by reducing its velocity and its erosive impact on the contents of the basin. An example of a double-tiered baffle unit 610 is shown in FIG. 7B. This configuration provides an additional level of baffling to incoming storm water.

An example of a retention basin wall 700 is shown in FIG. 8. The segments employed in such a wall 700 are placed relative to ground surface 12 so that the notches 110 are at a level where storm water can flow from the surrounding ground surface 12 into the basin through the notches 110 (or out of the basin through the notches 110 when the basin is full). If it is desired not to have an exposed notch 110 on every segment 100, selected segments 100a can be inverted so that their notches 110 face downwardly.

Figure 9B:
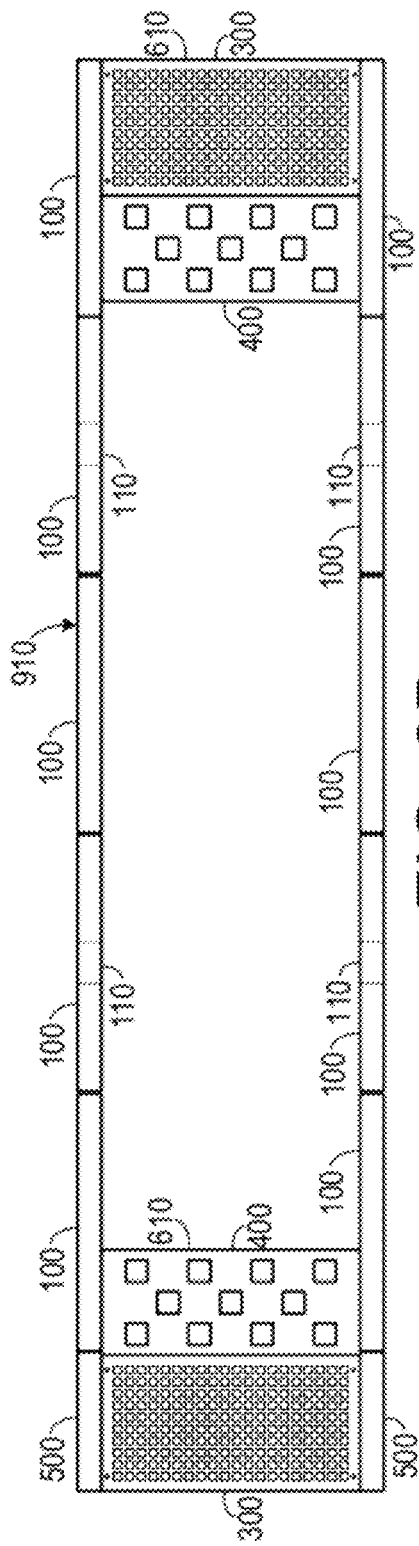
Figure 9C:
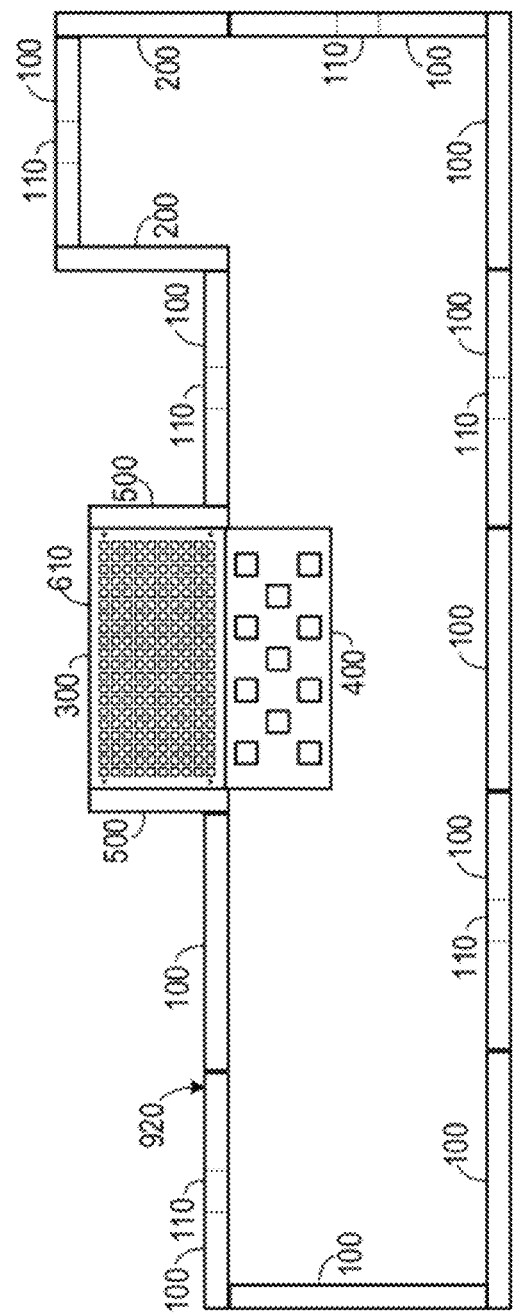

Several different configurations of the many different configurations of retention basins made possible with the present invention are shown in FIGS. 9A-9C. A substantially linear basin enclosure 900 is shown in FIG. 9A; a substantially linear basin enclosure 910 including two oppositely-disposed baffle units 610 is shown in FIG. 9B; and a cornered basin enclosure 920 is shown in FIG. 9C.

The embodiments disclosed herein have the advantages of being easy to transport, inexpensive and they can be arranged in many different layouts to accommodate the available geometry of a specific site. They also have the advantage of being easily modified to allow for changes in design.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A kit of components for assembly into a storm water management system, comprising:
   a. a plurality of precast vertical wall segments, each having a top end, disposed in a configuration to form a peripherally enclosed basin that has an open top side, the top end of at least a first one of the plurality of precast vertical wall segments defining a notch that is disposed at ground level relative to a surrounding ground surface so as to be configured to allow water to flow directly from the ground surface through the notch into the basin, each of the plurality of precast vertical wall segments having a left end and a right end, each right end complimentary in shape to the left end of each other one of the plurality of precast vertical wall segments so that the plurality of precast vertical wall segments are configured to be placed in any one of a plurality of different orderings to form the enclosed basin, each of the plurality of precast vertical wall segments configured to fit next to each other of the plurality of precast vertical wall segments in both a straight alignment and a cornered alignment so that any two of the plurality of precast vertical wall segments can form a selected one of either a straight wall or a corner, each of the left end and the right end defining a smooth and uniform bore, the bore configured so that when a first wall segment is placed next to a second wall segment a portion of the bore defined by the first wall segment is aligned with a portion of the bore defined by the second wall segment both when the first wall segment is in an end-to-end relationship with the second wall segment and when the first wall segment is in a corner relationship with the second wall segment; and
   b. a plurality of cylindrical dowels having a smooth outer surface with a constant diameter, each of which is complementary in shape with a portion of each of the uniform bores defined by the precast vertical wall segments and each of the plurality of cylindrical dowels having an outer surface so as to be configured to slide into each of the bores defined by the precast vertical wall segments, the plurality of cylindrical dowels configured to hold each one of the plurality of precast vertical wall segments in a selected one of a straight alignment or a cornered alignment with each adjacent ones of plurality of precast vertical wall segments.

2. The kit of components for assembly into a storm water management system of claim 1, wherein each of the plurality of precast vertical wall segments comprises concrete.

3. The kit of components for assembly into a storm water management system of claim 1, the top end of at least a second one of the plurality of precast vertical wall segments defining a notch that is configured to allow storm water to flow out of the basin to outside of the basin.

* * * * *